(12) United States Patent
Sendonaris

(10) Patent No.: US 6,728,303 B2
(45) Date of Patent: Apr. 27, 2004

(54) TIMING DISCRIMINATOR WITH MERGE PROTECTION

(75) Inventor: Andrew Sendonaris, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 203 days.

(21) Appl. No.: 09/898,991

(22) Filed: Jul. 3, 2001

(65) Prior Publication Data

US 2002/0150186 A1 Oct. 17, 2002

Related U.S. Application Data

(60) Provisional application No. 60/275,253, filed on Mar. 12, 2001.

(51) Int. Cl.$^7$ ............................................... H04B 1/707
(52) U.S. Cl. ...................... 375/148; 375/149; 375/354
(58) Field of Search ........................ 375/144, 145, 375/148, 149, 346, 347, 354; 370/320, 325, 342, 441

(56) References Cited

U.S. PATENT DOCUMENTS

| | | | |
|---|---|---|---|
| 5,903,308 A | * | 5/1999 | Cooper et al. ............... 348/211 |
| 5,960,040 A | * | 9/1999 | Cai et al. ..................... 375/279 |
| 5,978,423 A | | 11/1999 | Farjh |
| 6,078,611 A | | 6/2000 | La Rosa et al. |

* cited by examiner

Primary Examiner—Don N. Vo
(74) Attorney, Agent, or Firm—Philip R. Wadsworth; Charles D. Brown; Timothy F Louis

(57) ABSTRACT

A process and apparatus for timing occurs in a timing discriminator that is part of a time tracking loop. The timing discrimination that prevents Rake finger merging. The process for timing discrimination discriminator is coupled to an input signal. The process begins by gathering early, ontime, and late samples of the input signal. Early, Ontime, and Late parameters are then derived in response to the samples. The timing discriminator output is generated in response to a predetermined relationship between the Early, Ontime, and Late parameters. The process and apparatus enables Rake fingers to freely track their paths. This improves the receiver performance.

28 Claims, 6 Drawing Sheets

TIMING DISCRIMINATOR WITH MERGE PROTECTION

CROSS-REFERENCE TO RELATED APPLICATIONS

This application claims the benefit of U.S. Provisional Patent Application No. 60/275,253, filed Mar. 12, 2001.

BACKGROUND OF THE INVENTION

1. Field of the Invention

The present invention relates generally to communications. Particularly, the present invention relates to timing discrimination in a communications environment.

2. Description of the Related Art

A conventional Rake receiver operates on received signals with correlators known as "fingers". A Rake receiver, on the basis of complex channel coefficients of each desired multipath component, coherently combines finger outputs. Complex channel coefficients may be obtained from periodically transmitted training sequences, in a known manner.

In code division multiple access (CDMA) systems, it is known to assign multiple fingers to different signal paths. Each finger tracks its assigned path using a closed loop, time tracking loop (TTL) associated therewith to control its location.

When the paths become sufficiently close to each other, the TTL's of the fingers tracking individual paths sometimes cause the lose fingers to merge. Merging, due to adverse fading conditions, implies, for example, one finger abandons the path it was originally tracking and starts tracking a path already being tracked by another finger.

To avoid fingers from merging, it is known to use a simple early–late timing discriminator, whose output enables the associated TTL to "pull-in" a path that may be up to one chip away from the current position of the finger. This concept is illustrated in FIG. 1.

FIG. 1 shows a plot of the output of a receive filter versus time. It would be best to sample the waveform at the peak during the on-time sample. However, since this cannot always be accomplished, an early sample is taken approximately half a chip time (Tc/2) before the on-time sample and a late sample is taken approximately half a chip time after the on-time sample.

If the early sample minus the late sample (E–L) is equal to zero, then $\Delta t_{res}=0$. If E–L<0, then $\Delta t_{res}<0$ showing that the sample was taken too early. If E–L>0, then $\Delta t_{res}>0$ showing that the sample was taken too late.

The Early–Late timing discriminator works only as long as the paths are far enough apart such that the curve of FIG. 1 for the first path does not overlap the same curve for a second path. Due to fading, there may be a time when one of the paths is much weaker than the other one. When this happens the timing discriminators of both fingers will be pulling both fingers towards the strongest path. If this condition lasts long enough the finger that used to be tracking the weak path will start to move in the direction of the strong path. Eventually, fading conditions will move the fingers close enough together until they merge. Once the fingers merge they cannot be separated because their timing discriminator outputs will be identical.

The tracking of a single path by multiple fingers is an undesirable condition for many reasons. Two or more fingers are now being wasted on one path. Also, the energy from the "abandoned" path is lost because the finger that was tracking this path is now merged with another path.

Merged fingers also degrade performance in more subtle ways. For example, the merged fingers not only do not improve the performance of the Rake receiver but also will contribute to the $$\frac{E_c}{N_t} \text{ or } \frac{E_c}{I_o}$$

estimation used for power control. This results in a mobile station requesting the base station to increase transmit power. If there are any other fingers combining, this disproportionately weights the paths with merged fingers tracking them.

By avoiding Rake finger merging, the performance of the overall system is enhanced as measured by the frame error rate (FER) of the system as a function of the signal to noise ratio. There is a resulting need to prevent Rake finger merging and allow the fingers to freely track their paths in order to greatly reduce the frequency that the processor must interfere with the operation of the fingers.

SUMMARY OF THE INVENTION

The present invention encompasses a process and apparatus for timing discrimination that prevents Rake finger merging. The process for timing discrimination occurs in a timing discriminator that is part of a time tracking loop. The timing discriminator is coupled to an input signal.

The process begins by gathering early, ontime, and late samples of the input signal. Early, Ontime, and Late parameters are then derived in response to the samples.

The timing discriminator output is generated in response to a predetermined relationship between the Early, Ontime, and Late parameters. In the preferred embodiment, this relationship is expressed as if (β·Early>Ontime) OR (β·Late>Ontime)

TD=0 otherwise

TD=Early–Late

The present invention, therefore, enables Rake fingers to freely track their paths. This improves the receiver performance.

DETAILED DESCRIPTION OF THE PREFERRED EMBODIMENT

The present invention provides a communication device with improved performance by preventing the Rake fingers from merging. This is accomplished by using a timing discriminator that shuts out interference from neighboring paths.

Figure 1:
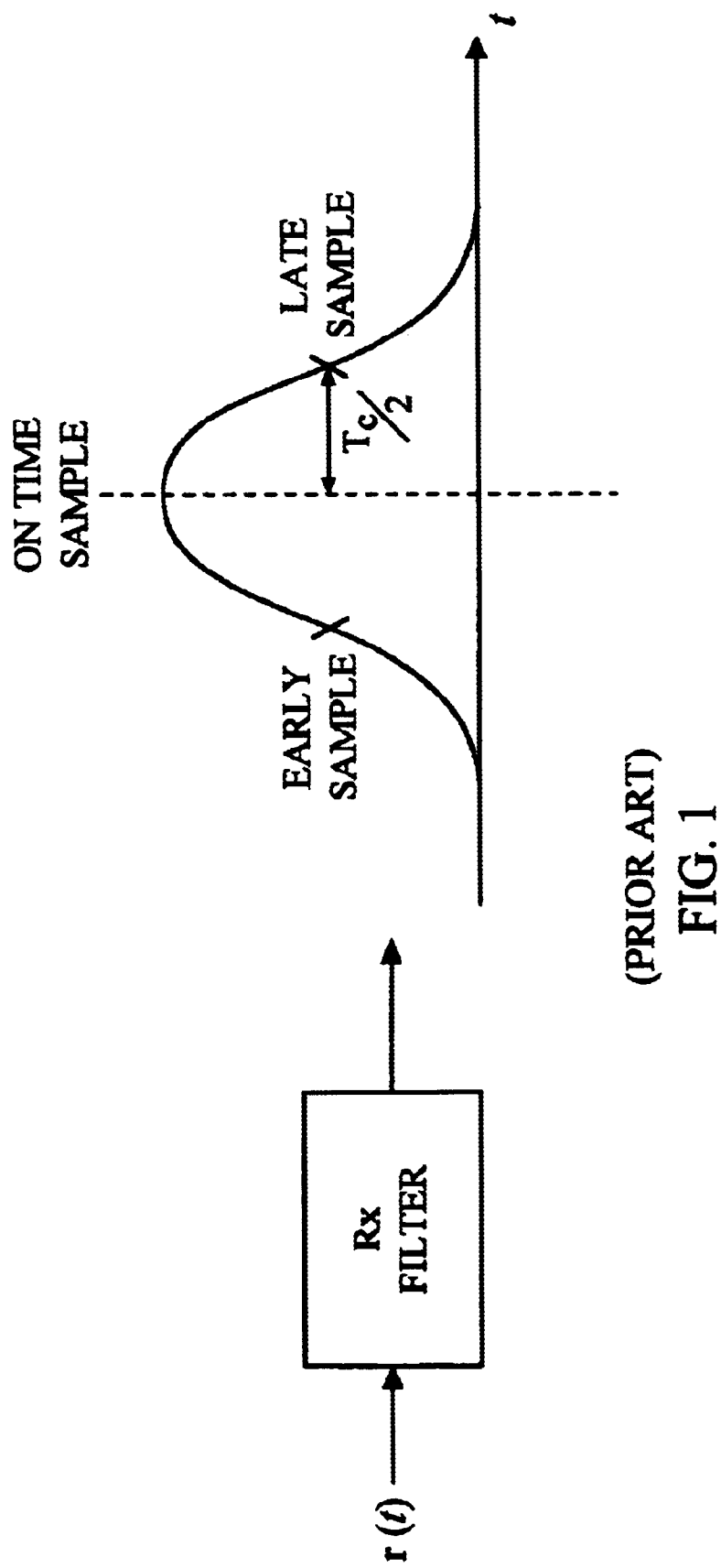
FIG. 1 shows a plot of an output of a typical prior art receive filter versus number of chips to describe early–late timing discrimination.
Figure 2:
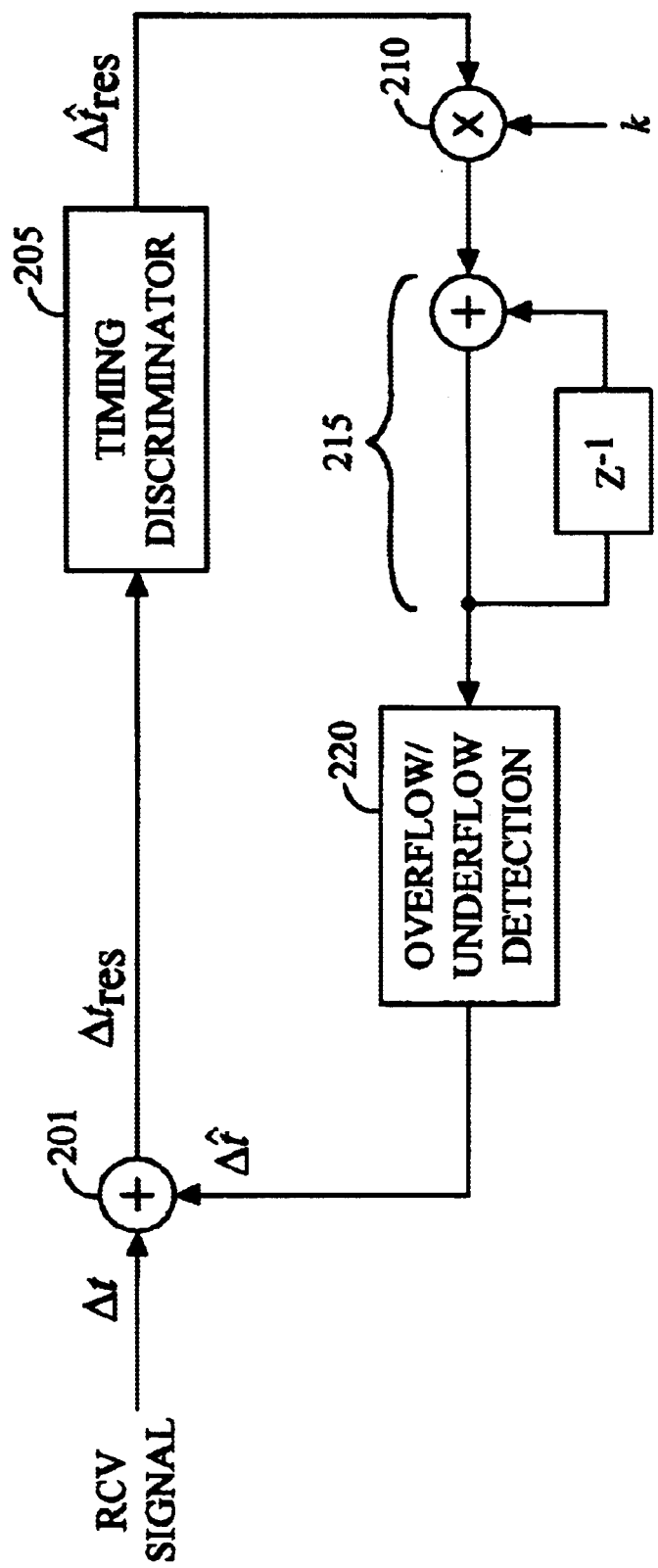
FIG. 2 shows a block diagram of a time tracking loop utilizing a timing discriminator in accordance with an embodiment of the invention.

FIG. 2 illustrates a block diagram of a TTL having a timing discriminator in accordance with an embodiment of the invention. The TTL uses inputs from the finger to keep the finger tracking the path. The difference between when a transmitted signal was sent and when it was received is subsequently referred to as Δt.

The estimate of this difference is referred to as $\hat{\Delta t}$, that is, an estimate of where the finger should be in order to properly track the path. This estimate is implicitly reflected by the issuance of several advance/retard commands that try to align the timing of the receiver to the proper timing. The effect of this advance/retard mechanism is that $\hat{\Delta t}$ is effectively subtracted (201) from Δt, leaving the signal with a residual error that is referred to as $\Delta t_{res}$. The residual timing error, $\Delta t_{res}$, is input to a timing discriminator (205).

In an exemplary embodiment, the timing discriminator (205) estimates the residual error in the input signal in order to control where the finger is placed. The output of the timing discriminator (205), $\hat{\Delta t}_{res}$, is input to a first order filter (210) which filters the estimated residual error.

The filtered signal is input to an accumulator (215) that sums the errors until an overflow or underflow condition is reached. An overflow condition is reached when the accumulator (215) output goes over a predetermined error range. In this case, an advance signal is issued by the overflow/underflow detection (220) that moves the finger forward in time. An underflow condition is reached when the accumulator (215) output goes below the predetermined error range. In this case, a retard signal is issued by the overflow/underflow detection (220) that moves the finger back in time. The closed loop TTL then continues as above in order to track the path.

The detection of an overflow or underflow condition depends on the scaling in the hardware implementation of the TTL. In an exemplary embodiment, the range of −256 to 256 is used. However, alternate embodiments use other ranges if the TTL data path is scaled differently.

The timing discriminator (205) of the present invention effectively shuts out interference from neighboring paths. This is accomplished by using a reduced pull-in range in comparison to the large pull-in range of conventional timing discriminator methodology.

As was explained above, a large pull-in range is one of the factors that cause fingers to merge. By comparison, if a timing discriminator uses a small pull-in range, when one path becomes weak, the other "close" path is not able to pull-in the weak path's finger. As fading conditions change, the two fingers are affected only by the path that they are supposed to be tracking.

The timing discriminator (TD) of one exemplary embodiment may be expressed as follows:

if (β·Early>Ontime) OR (β·Late>Ontime)

TD=0 otherwise

TD=Early−Late where Early and Late are monotonic functions of the magnitude of the early and late chip samples, respectively. Ontime is a monotonic function of the magnitude of the ontime chip sample. β is some non-negative number and is considered a design parameter that, as discussed subsequently, varies from application to application.

The above process shows that when the value of β times the magnitude of the early chip sample is greater than the magnitude of the ontime chip sample, then the timing discriminator output is zero. Similarly, if the value of β times the magnitude of the late chip sample is greater than the magnitude of the ontime chip sample, then the timing discriminator output is also zero. Otherwise, the output of the timing discriminator is the same as the Early–Late process as discussed above.

From the above definition of the timing discriminator, it can be seen that if β=0, the output is the same as the classic early–late discriminator. As β increases, the pull-in range decreases. Using β the pull-in range can be made to be as small as needed for the application.

The selection of an optimum value of β is application dependent. For example, in an application involving timing discrimination by a base station where the monitored mobile stations may be moving rapidly, the value of β might be different than if the mobile stations are moving slowly. Therefore, the value of β may need to be chosen by, for example, field trials in order to determine the optimum value for that particular application.

In an alternate embodiment, the value of β is dynamic and varies with time. The implementation of this embodiment is such that a searcher (process that looks for new paths) finds a new path and the finger assignment algorithm assigns a new finger to the new path. If there are no other fingers in the vicinity, then β is initially set to zero. This maximizes the pull-in range. The value of β stays the same as long as there are no other fingers in the vicinity (e.g., within ±2 chips).

However, when the searcher finds a path that is close to another path and the finger assignment algorithm assigns a finger to that path, the value of β will be increased, thus reducing the pull-in range for both.

In this alternate embodiment, β is varied as a function of the distance between adjacent fingers. As the finger assignment algorithm assigns fingers that are closer and closer together, β is increased in order to reduce the pull-in range. This effectively implements merge protection for the fingers. Since the paths, at most, move 0.04 chips/frame in a typical CDMA Rake receiver architecture, a processor may not need to change the value of β too often. It should be appreciated that optimum required values for β for a given situation might be determined by field experiments and trial and error.

Figure 3:
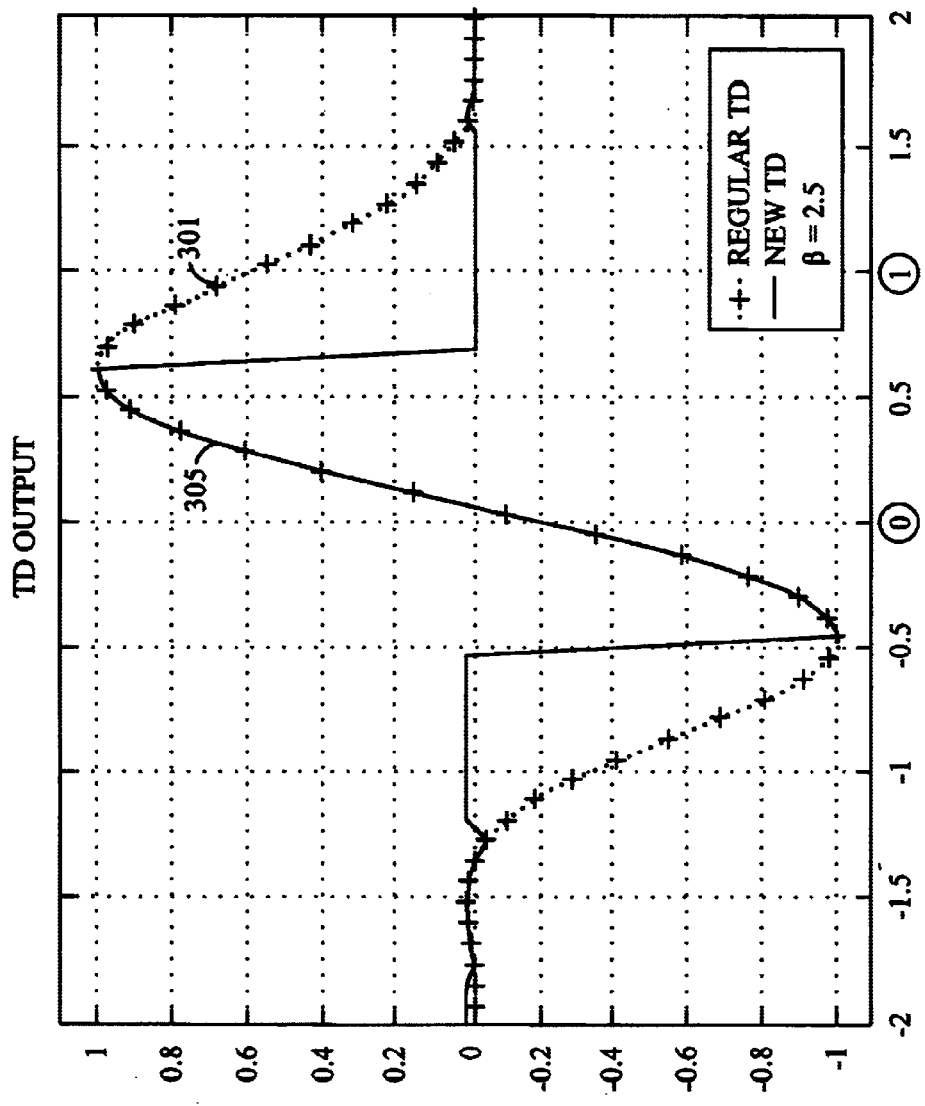
FIG. 3 shows comparison plots of the outputs of the timing discriminator of FIG. 2 versus a conventional timing discriminator.
Figure 4:
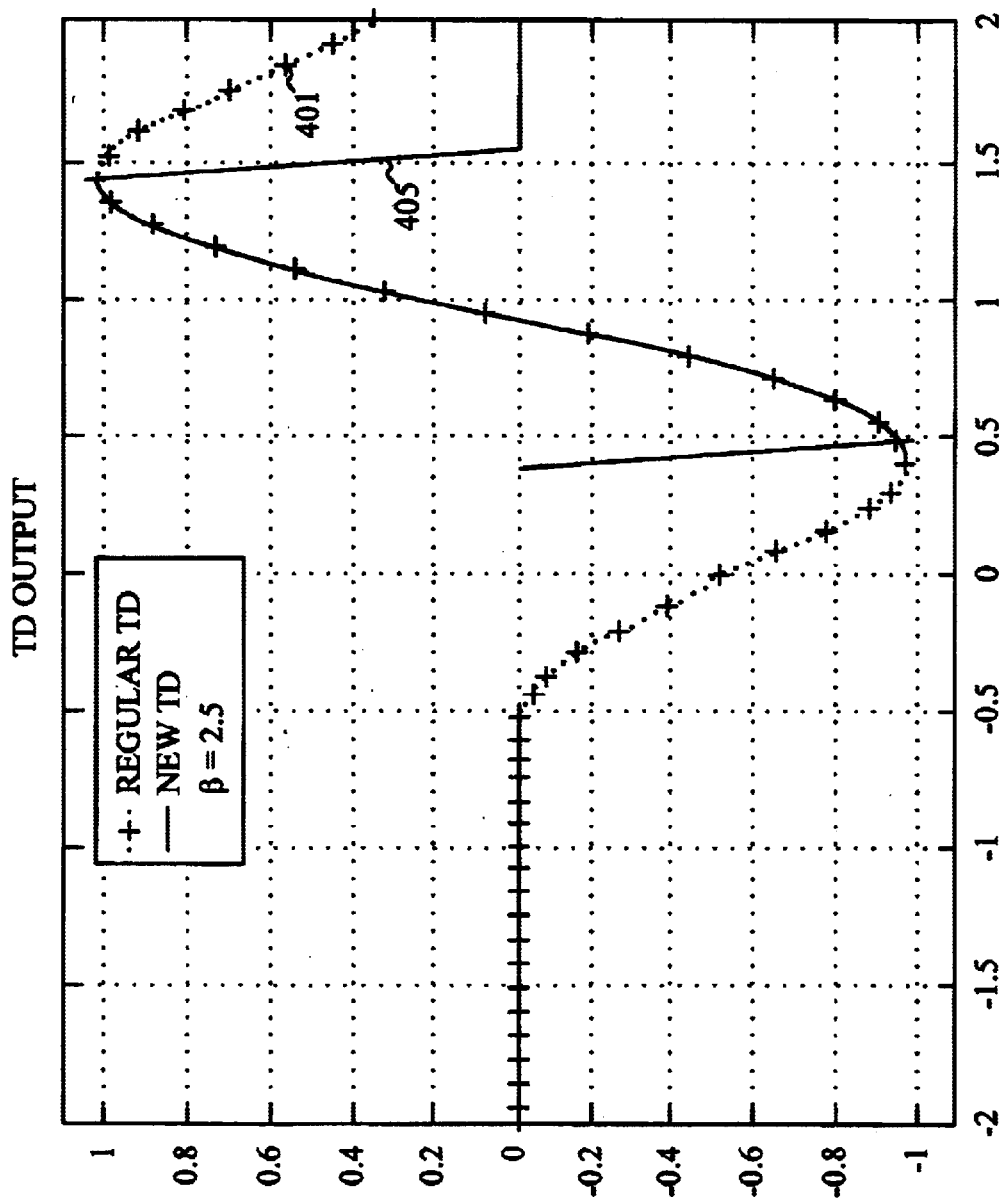
FIG. 4 shows comparison plots of the outputs of the timing discriminator of FIG. 2 versus a conventional timing discriminator under a different set of fading conditions.

The operation and benefits of the timing discriminator described herein versus those of a conventional early–late timing discriminator, are illustrated in the plots of FIGS. 3 and 4. FIG. 3 illustrates a plot of the timing discriminator output versus the chip offset. The figure attempts to illustrate how the outputs of the respective timing discriminators change as two paths get close together.

The distinct plots of FIG. 3 assume that Path 1 is located at chip offset 0 and has a magnitude of 1. Path 2 is located at chip offset 1 and has a magnitude of 0.2. The conventional (Regular TD) art timing discriminator output (301) is shown as overlapping Path 2 such that the finger assigned to Path 1 would be merged to the stronger Path 2 using the known early–late TD method.

The output of the improved timing discriminator operation described herein (305) has a much smaller pull-in range indicated by the sharper drop-off of the output. In this case, the improved (new) timing discriminator does not even recognize Path 2. Consequently, the tendency of the fingers from Path 1 to Path 2 merging is virtually eliminated.

FIG. 4 illustrates another example of the operation and benefits of the present invention under different fading conditions. Path 1 of this plot is located at chip offset 0 and has a magnitude of 0.2. Path 2 is located at chip offset 1 and has a magnitude of 1. This plot shows how timing discriminator outputs (new and regular) change when Path 2 starts to dominate Path 1. In the plot of the timing discriminator (401) having a larger pull-in range, the fingers are shown to begin to merge. The plot of the output of the timing discriminator (405) shows that the fingers are affected only by the path that they are supposed to be tracking and do not tend toward a merge condition.

Figure 5:
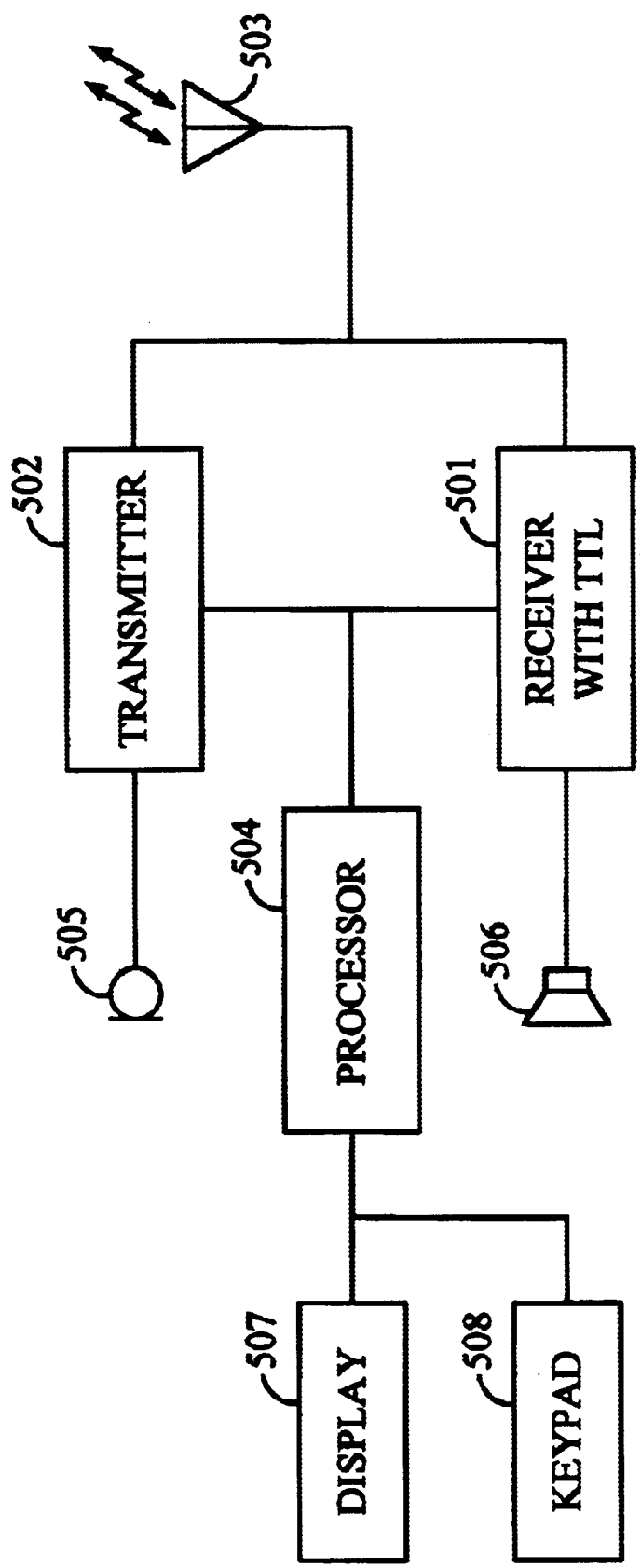
FIG. 5 shows a block diagram of a mobile station.

A block diagram of a mobile station incorporating the TTL with the timing discriminator operating as described herein is illustrated in FIG. 5. The mobile station is comprised of a transmitter (502) and receiver (501) that are coupled to an antenna (503). The transmitter modulates the aural signals from a microphone (505) for transmission. In some cases, depending on the type of communication device, the transmitter (502) or other device may digitize the aural signal from the microphone (505) prior to modulation. The antenna (503) then radiates the signal to the intended destination.

The receiver (501) is comprised of the TTL having the improved timing discriminator. The receiver is responsible for receiving and demodulating signals received over the antenna (503). The TTL is used within the receiver as discussed above. In some communication devices, the receiver may be responsible for converting received digital signals into their analog equivalent for radiation by the speaker (506).

The communication device is controlled by a processor (504) such as a microprocessor or other controlling device. The processor is coupled to and controls the transmitter (502) and receiver (501) functions. For example, the processor may be used to monitor the fingers for proper tracking and to execute the searcher and finger assignment algorithms.

A display (507) and keypad (508) are coupled to the processor (504) for displaying information entered by a user on the keypad (508). For example, the user may enter a telephone number using the keypad (508) that is displayed on the display (507) and subsequently transmitted to a base station using the transmitter (502).

In one embodiment, the communication device is a cellular radiotelephone incorporating the TTL and timing discriminator operating and constructed in accordance with the methods described above. A personal digital assistant with communication capabilities, computers with communication capabilities, and the like are also contemplated.

Figure 6:
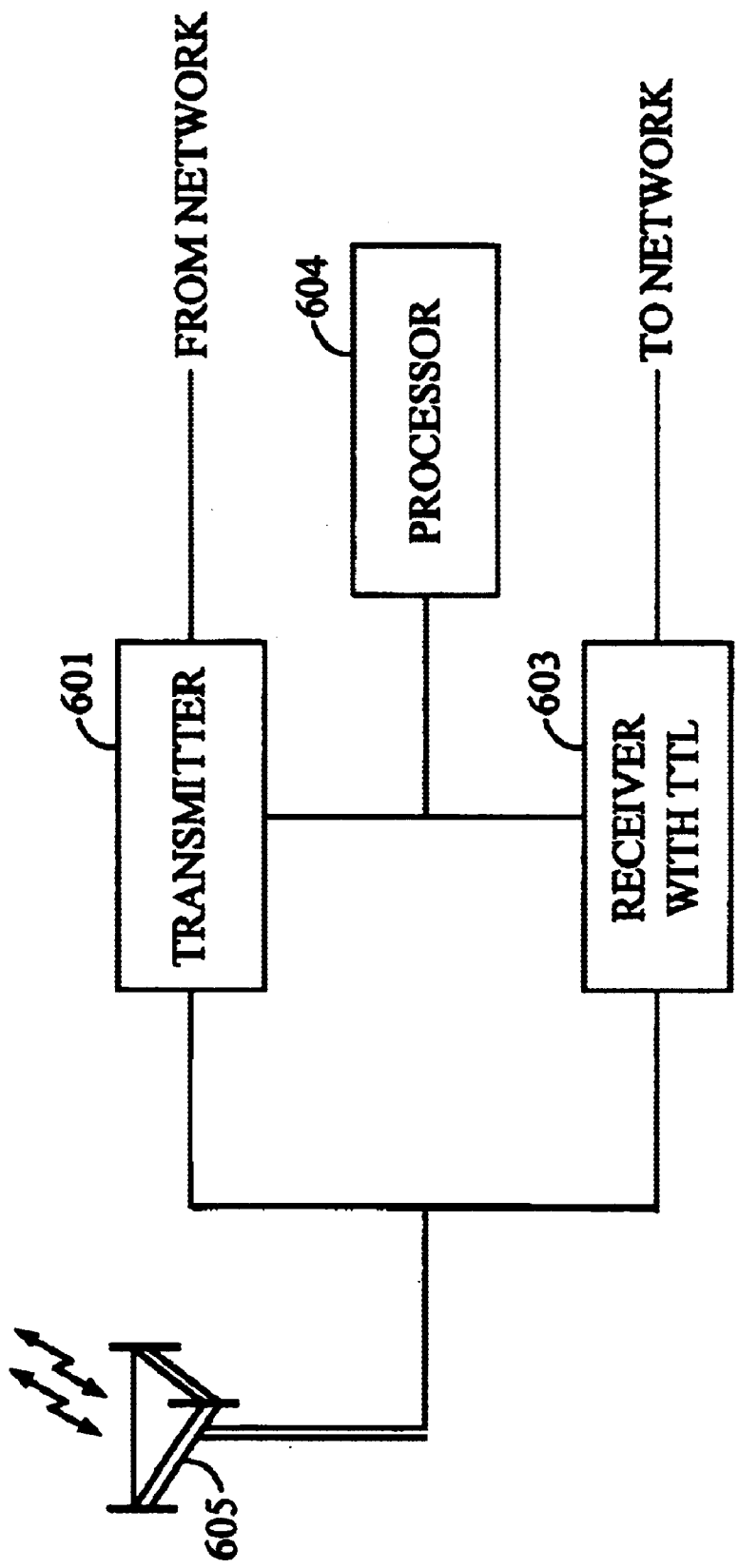
FIG. 6 shows a block diagram of a base station.

The timing discriminator described above may also be incorporated into a base station to improve the performance of the base station receiver. A block diagram of a base station incorporating a TTL having the improved timing discriminator is illustrated in FIG. 6. The base station is comprised of a transmitter (601) that receives a signal from the network to which the base station is coupled. The transmitter (601) modulates the signal and transmits the signal, at the proper power level, over the antenna (605).

A received signal is received by the antenna (605) and distributed to the receiver (603) that comprises a TTL with an improved timing discriminator. A receiver (603) tracks the frequency of the received signal and demodulates any appropriate signals. The demodulated signals are sent over the network that is coupled to the base station to the appropriate destination.

A processor (604) controls the operation of the base station including control of both the transmitter and receiver. The processor is responsible for executing the finger assignment algorithm and the searcher.

In the preferred embodiment, the base station illustrated in FIG. 6 operates in a cellular environment. Alternate embodiment base stations can be any base station that allows a mobile, wireless communication device to communicate with a fixed infrastructure.

In summary, a timing discriminator, its construction, function and operation, and alternate embodiments thereof have been described. The TD greatly reduces the need for the processor to implement merge protection by virtue of an improved method of moving fingers. The TD also improves performance over externally imposed merge protection as the various fingers are allowed to track their true timing. The present solution is radically different from approaches where fingers are simply prevented from moving in order to prevent them from merging.

The TD provides a built-in fat-path (two or more physical paths that are closer than one chip apart) detection. If there is only one path, the discriminator output is the same as the early-late discriminator (excluding the pull-in range). However, when there are two paths that are close to each other, the proposed timing discriminator automatically shuts out interference from the neighboring path.

When the timing discriminator is used in combination with external finger monitoring, the performance is enhanced even further. In this case, the frequency of external finger monitoring is reduced since the fingers track the paths more accurately than in an early-late scenario.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal.

In the alternative, the processor and the storage medium may reside as discrete components in a user terminal. The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein."

What is claimed is:

1. A method of timing discrimination in a timing discriminator coupled to an input signal, the method comprising:

gathering early, ontime, and late samples of the input signal;

deriving Early, Ontime, and Late parameters in response to the early, ontime, and late samples, respectively; and setting the timing discriminator output to zero in response to a predetermined relationship between the Early, Ontime, and Late parameters, even if the early, ontime and late samples otherwise indicate a timing adjustment may be desirable.

2. The method of claim 1, wherein the timing discriminator is used in a time-tracking loop.

3. The method of claim 1, wherein the predetermined relationship between the Early, Ontime, and Late parameters is expressed as "($\beta$·Early) OR ($\beta$·Late)> Ontime", wherein $\beta$ is a design parameter, a non-negative number and is application-specific.

4. The method of claim 1, wherein the Early, Ontime, and Late parameters are monotonic functions of the magnitude of the early, ontime, and late samples, respectively.

5. The method of claim 1, further including the step of setting the timing discriminator output to the results of Early−Late when the predetermined relationship is not satisfied.

6. The method of claim 5, further including the step of moving fingers of a Rake receiver in response to the output of the timing discriminator.

7. A method of timing discrimination in a timing discriminator coupled to an input signal, the timing discriminator being part of a Rake receiver having a plurality of fingers for tracking signal paths, the method comprising:

gathering early, outline, and late samples that are used to derive parameters Early, Outline, and Late, respectively;

selecting a parameter $\beta$, wherein $\beta$ is a non-negative number; and generating a timing discriminator output by:

calculating quantities ($\beta$·Early) and ($\beta$·Late);

if either ($\beta$·Early) or ($\beta$·Late) are greater than the parameter Ontime, setting the timing discriminator output to zero;

if ($\beta$·Early) or ($\beta$·Late) are less than or equal to the parameter Ontime, setting the timing discriminator output to a result of Early−Late.

8. The method of claim 7, wherein the timing discriminator is used in a time-tracking loop.

9. A method of timing discrimination in a timing discriminator coupled to an input signal, the timing discriminator being part of a Rake receiver having a plurality of fingers for tracking signal paths, the method comprising:

gathering early, ontime, and late samples that are used to derive parameters Early, Ontime, and Late, respectively;

selecting a parameter $\beta$, wherein $\beta$ is selected as a function of the distance between the fingers of the Rake receiver; and generating a timing discriminator output by:

calculating quantities ($\beta$·Early) and ($\beta$·Late);

if either ($\beta$·Early) or ($\beta$·Late) are greater than the parameter Ontime, setting the timing discriminator output to zero;

if ($\beta$·Early) or ($\beta$·Late) are less than or equal to the parameter Ontime, setting the timing discriminator output to a result of Early−Late.

10. The method of claim 9, wherein $\beta$ is dynamically varied over time as a function of the distance between the fingers of the Rake receiver.

11. The method of claim 10, wherein the value of $\beta$ is increased as the distance between the fingers is decreased.

12. The method of claim 10, wherein the value of $\beta$ is decreased as the distance between the fingers is increased.

13. A timing discriminator apparatus having an input signal comprising a plurality of symbols, the apparatus comprising:

means for gathering early, ontime, and late samples of the input signal;

means for deriving Early, Ontime, and Late parameters in response to the early, ontime, and late samples, respectively; and means for setting the timing discriminator output to zero in response to a predetermined relationship between the Early, Outime, and Late parameters, even if the early, ontime and late samples otherwise indicate a timing adjustment may be desirable.

14. The apparatus of claim 13, wherein the predetermined relationship between the Early, Ontime, and Late parameters comprises "($\beta$·Early) OR ($\beta$·Late)>Ontime", wherein $\beta$ is a design parameter, a non-negative number and is application specific.

15. A mobile communications device comprising:

a Rake receiver for tracking, with fingers, received signals on a plurality of paths, each path being assigned a separate finger of the plurality of fingers, the receiver comprising a time tracking loop having a timing discriminator that controls movement of the fingers, the timing discriminator further comprising:

means for gathering early, ontime, and late samples of an input signal;

means for deriving Early, Ontime, and Late parameters in response to the early, ontime, and late samples, respectively; and means for defining a pull-in range; and means for setting the timing discriminator output to zero when a predetermined relationship between the Early, Ontime, and Late parameters indicates a path is out of the pull-in range so as to avoid finger merging.

16. The mobile communications device of claim 15, wherein the predetermined relationship between the Early, Outline, and Late parameters comprises "($\beta$·Early) OR ($\beta$·Late)>Ontime", wherein $\beta$ is a design parameter, non-negative number and is application-specific.

17. The mobile communications device of claim 15, further comprising a transmitter for modulating a code division multiple access output signal over a channel.

18. The mobile communications device of claim 15, wherein the received signals are code division multiple access signals.

19. In a base station receiver adapted for use in a wireless communications network, a Rake receiver for tracking, with fingers received signals on a plurality of pats, each path being assigned a separate finger of the plurality of fingers, the receiver comprising a time tracking loop having a timing discriminator that controls movement of the fingers, the timing discriminator further comprising:

means for gathering early, ontime, and late samples of an input signal;

means for deriving Early, Ontime, and Late parameters in response to the early, outline, and late samples, respectively; and means for defining a pull-in range; and means for setting the timing discriminator output to zero when a predetermined relationship between the Early, Ontime, and Late parameters indicates a path is out of the pull-in range so as to avoid finger merging.

20. The mobile communications device of claim 19, wherein the predetermined relationship between the Early, Ontime, and Late parameters comprises "($\beta$·Early) OR ($\beta$·Late)>Ontime", wherein $\beta$ is a design parameter, a non-negative number and is application-specific.

21. A time tracking loop apparatus coupled to an input signal indicating a timing difference, the apparatus comprising:

an advance/retard mechanism coupled to the input signal for generating a residual signal;

a timing discriminator coupled to the advance/retard mechanism for generating an estimated residual signal in response to the residual signal, the timing discriminator comprised of:

means for gathering early, ontime, and late samples of the residual signal;

means for deriving Early, Ontime, and Late parameters in response to the early, outline, and late samples, respectively; and means for setting the timing discriminator output to zero in response to a predetermined relationship between the Early Ontime, and Late parameters, even if the early, ontime and late samples otherwise indicate a timing adjustment may be desirable;

a filter, coupled to the timing discriminator, for filtering the timing discriminator output to generate a filtered discriminator value;

an accumulator, coupled to the filter, for generating an accumulated discriminator value in response to an accumulation of a plurality of filtered discriminator values;

an overflow/underflow detector, coupled to the accumulator for generating the control signal in response to the accumulated discriminator value.

22. The apparatus of claim 21, wherein the timing difference is a time between transmission of a tracked signal and receipt of the tracked signal.

23. The apparatus of claim 21, wherein the overflow/underflow detector generates an overflow signal when the accumulated discriminator value exceeds a predetermined range.

24. The apparatus of claim 21, wherein the overflow/underflow detector generates an underflow signal when the accumulated discriminator value is less than a predetermined range.

25. A timing discriminator for ase with a Rake receiver having a plurality of fingers, the timing discriminator outputting an output to said Rake receiver, the timing discriminator comprising:

at least one input for gathering early, ontime, and late samples that are used to derive parameters Early, Ontime, and Late, respectively;

means for selecting a parameter $\beta$, wherein is selected as a function of the distance between the fingers of the Rake receiver; and means for calculating quantities ($\beta$·Early) and (($\beta$·Late);

means for setting the timing discriminator output to zero if either ($\beta$·Early) or ($\beta$·Late) are greater than the parameter Ontime; and means for setting the timing discriminator output to a result of Early–Late if ($\beta$·Early) or ($\beta$·Late) are less than or equal to the parameter Ontime.

26. The timing discriminator of claim 25, wherein $\beta$ is dynamically varied over time as a function of the distance between the fingers of the Rake receiver.

27. The timing discriminator of claim 25, wherein the value of $\beta$ is increased as the distance between the fingers is decreased.

28. The timing discriminator of claim 25, wherein the value of $\beta$ is decreased as the distance between the fingers is increased.

* * * * *